(12) United States Patent  
Hilbert

(10) Patent No.: US 9,382,684 B1  
(45) Date of Patent: Jul. 5, 2016

(54) MESHLESS BLANKET FOR GRASS SEED

(71) Applicant: Rhino Seed & Landscape Supply, L.L.C., Brighton, MI (US)

(72) Inventor: Eric Scott Hilbert, Howell, MI (US)

(73) Assignee: Rhino Seed & Landscape Supply, LLC, Brighton, MI (US)

( * ) Notice: Subject to any disclaimer, the term of this patent is extended or adjusted under 35 U.S.C. 154(b) by 146 days.

(21) Appl. No.: 14/209,394

(22) Filed: Mar. 13, 2014

Related U.S. Application Data

(60) Provisional application No. 61/779,526, filed on Mar. 13, 2013.

(51) Int. Cl.
| | |
|---|---|
| *D04H 1/425* | (2012.01) |
| *D04H 1/4266* | (2012.01) |
| *D04H 1/587* | (2012.01) |
| *D04H 1/64* | (2012.01) |
| *D04H 1/645* | (2012.01) |
| *D04H 1/72* | (2012.01) |
| *C09J 123/08* | (2006.01) |
| *C09K 17/52* | (2006.01) |
| *A01G 13/02* | (2006.01) |
| *E02D 17/20* | (2006.01) |
| *A01G 13/00* | (2006.01) |
| *E02B 3/12* | (2006.01) |

(52) U.S. Cl.
CPC .......... *E02D 17/202* (2013.01); *A01G 13/0268* (2013.01); *C09J 123/0853* (2013.01); *C09K 17/52* (2013.01); *D04H 1/425* (2013.01); *D04H 1/4266* (2013.01); *D04H 1/587* (2013.01); *D04H 1/64* (2013.01); *D04H 1/645* (2013.01); *D04H 1/72* (2013.01); *E02B 3/125* (2013.01)

(58) Field of Classification Search
CPC ....... D04H 1/425; D04H 1/4266; D04H 1/58; D04H 1/587; D04H 1/64; D04H 1/641; D04H 1/645; D04H 1/70; D04H 1/72; C09J 123/0853; C09J 123/0861; C09K 17/52; E02D 17/202; A01G 1/005; A01G 13/0268; E02B 3/125
See application file for complete search history.

(56) References Cited

U.S. PATENT DOCUMENTS

| | | | |
|---|---|---|---|
| 3,867,250 A * | 2/1975 | Jankowiak | ............ C09J 109/10 405/19 |
| RE28,950 E | 8/1976 | Jankowiak et al. | |
| 4,283,445 A | 8/1981 | Bartholl | |
| 4,357,780 A | 11/1982 | Ball | |
| 5,330,828 A | 7/1994 | Jacobsen, Jr. et al. | |
| 5,484,501 A | 1/1996 | Jacobsen, Jr. et al. | |
| 5,735,982 A | 4/1998 | Prunty et al. | |
| 5,786,281 A | 7/1998 | Prunty et al. | |
| 6,235,811 B1 * | 5/2001 | Robeson | ................ C08G 59/50 523/406 |
| 2006/0070294 A1 * | 4/2006 | Spittle | ................ A01G 13/0268 47/9 |

* cited by examiner

Primary Examiner — Michael Tolin  
(74) Attorney, Agent, or Firm — Price Heneveld LLP

(57) ABSTRACT

A netless straw mat or blanket for grass seed and other such applications is formed by applying an adhesive to a layer of straw. The layer of straw is compressed and formed into a roll for distribution and use at an installation site.

10 Claims, 1 Drawing Sheet

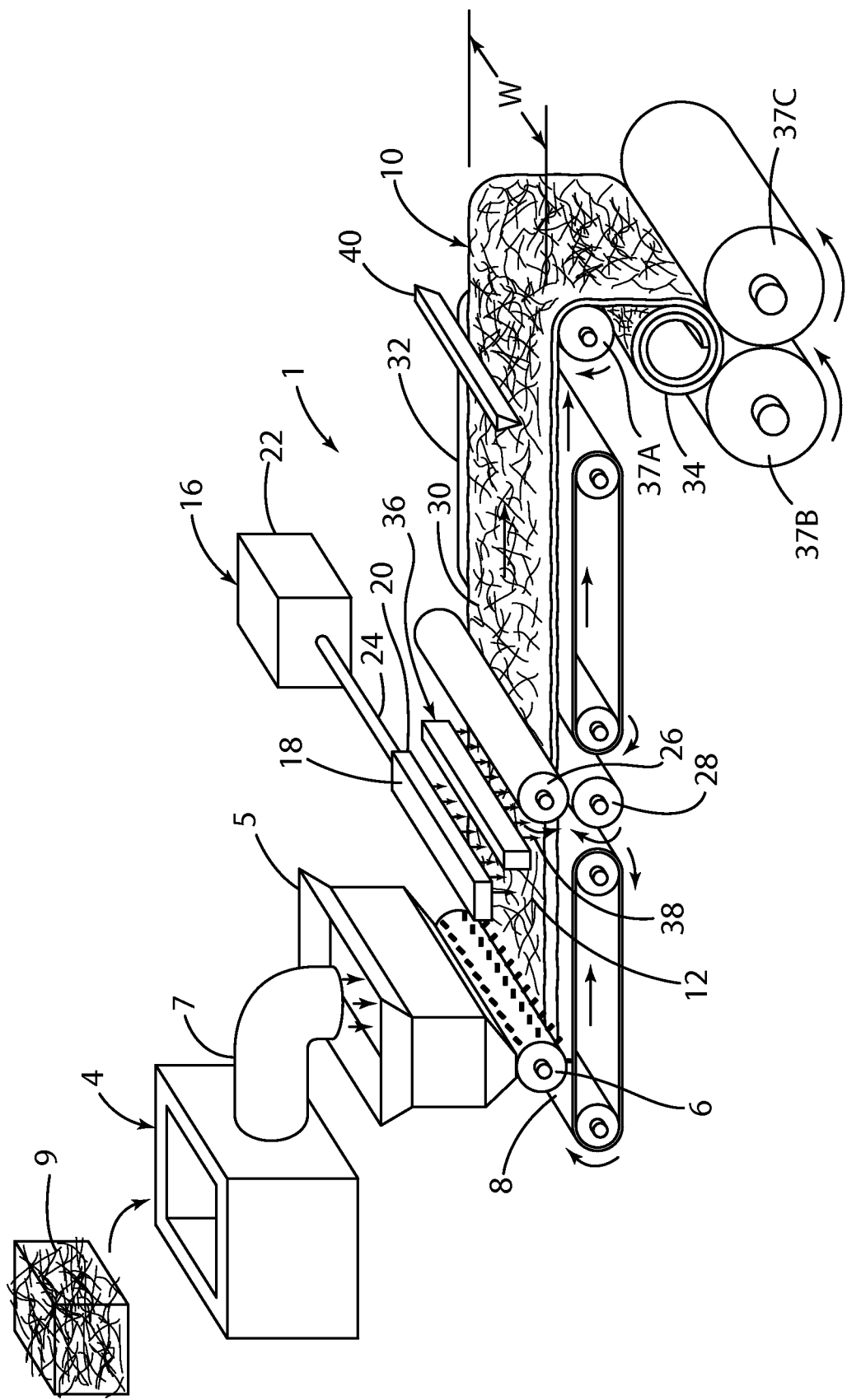

MESHLESS BLANKET FOR GRASS SEED

CROSS-REFERENCE TO RELATED APPLICATION

This application claims the benefit of U.S. Provisional Application No. 61/779,526 filed on Mar. 13, 2013, entitled, MESHLESS BLANKET FOR GRASS SEED, the entire contents of which are incorporated herein by reference.

BACKGROUND OF THE INVENTION

Various types of erosion control blankets or mats have been developed. In use, blankets of this type are placed on the ground following excavation or the like to prevent erosion, retain moisture, and to protect the seeds from being blown away due to wind or weather. The blankets also prevent or reduce consumption of grass seeds by birds or other animals.

Known erosion control blankets may be made from straw or other material that is held together by a mesh including polymer net and polymer thread. The polymer net does not readily degrade, and the net may therefore remain for some time after the grass has begun to grow. The net tends to become entangled in lawn mowers, and may also pose a hazard for wildlife.

SUMMARY OF THE INVENTION

One aspect of the present invention is the method of making netless/meshless mat for erosion control of soil that has been seeded for grass or the like. The method includes providing plant material comprising stalks of plants. The plant material may comprise straw or other suitable substantially dry material. The plant material is formed in a layer, an adhesive is applied to the layer of plant material. The layer of plant material may be formed on a moving conveyor, and the adhesive may be sprayed onto the mat utilizing a spray head positioned above the conveyor. After the adhesive is applied one or more fans may be utilized to provide forced air drying of the adhesive. The layer of material is compressed (before or after drying the material utilizing forced air) utilizing a pair of rollers or a pressing plate. The mat may be formed into a roll, or it may cut into individual sheets and stacked. The mat may be placed onto a soil surface that has been seeded with grass or other seeds to prevent erosion and to protect the grass seeds from birds and other animals. The blanket does not require polymer mesh or other reinforcements.

BRIEF DESCRIPTION OF THE DRAWINGS

The FIGURE is a partially schematic isometric view of a device utilized to make an erosion control blanket according to one aspect of the present invention.

DETAILED DESCRIPTION

With reference to the FIGURE, a device 1 may be utilized to produce an erosion control blanket 10 according to one aspect of the present invention. According to one aspect of the present invention, bales of straw 9 are fed into a separator or chopper 4 that breaks up the bales of straw 9 and blows loose straw through a conduit 7 to a hopper 5. Straw from hopper 5 is distributed onto a first conveyor 8 by a tamber wheel 6 to create a relatively uniform layer 12 of straw 2 on first conveyor 8. The chopper 4, hopper 5, and tamber wheel 6 may comprise known components previously utilized in the art in connection with production of straw blankets of the type having a mesh reinforcement. Although separator 4 is referred to as a "chopper", it will be understood that the primary function of the separator or chopper 4 is to break up the bales of straw 9, and the individual stalks of straw are preferably not cut or broken such that the stalks remain as long as possible. Conveyor 8 moves the layer of straw 12 under an applicator 18 of an adhesive-applying device 16. Adhesive-applying device 16 may comprise a reservoir/pump unit 22, and a conduit 24 that supplies adhesive to the applicator 18. Applicator 18 may comprise a spray head that sprays adhesive 20 onto layer 12 of straw 2. The adhesive 20 may comprise a hot melt adhesive, and the glue-applying device 16 may include a heating element or unit (not shown) that heats/melts the adhesive 20 prior to application by applicator 18. Alternatively, as discussed below, applicator 18 may comprise a sprayer that applies a biodegradable ethylene vinyl acetate adhesive that may be dried using forced air 38 of fan unit 36. In the illustrated example, applicator 18 comprises an elongated spray head that distributes the adhesive 20 onto the layer 12 of straw. However, the glue may be applied utilizing a plurality of individual spray heads or other suitable device.

After the adhesive 20 is applied, the layer 12 of straw 2 passes between first and second rollers 26 and 28. The rollers 26 and 28 compress the layer 12 to form a mat or blanket 30. The layer 12 of straw may be compressed utilizing devices other than rollers 26 and 28. For example, a reciprocating press plate (not shown) may be utilized to compress the layer 12. After being compressed, the mat or blanket 30 is then transported on an optional second conveyor 32 and wound onto a roll 34. The blanket 30 may have a width "W" of about 4', and may be cut into pieces having a length of, for example, 25' such that roll 34 comprises a 4'×25' piece of mat or blanket 30.

The adhesive 20 may comprise a HM067 hot melt adhesive available from Southern Chemical Formulators, Inc. This adhesive is preferably applied at a rate of about four pounds for each 4'×25' blanket, or about 0.04 pounds per square foot. This provides a mat or blanket 30 having significant strength.

Alternatively, adhesive 20 may comprise an ethylene vinyl acetate co-polymer such as LD Davis APX 1039 available from LD Davis Industries of Jenkintown, Pa. This adhesive is biodegradable, and provides sufficient strength and flexibility to permit the blanket to be wound into rolls for transportation and storage. Other suitable adhesives include LD Davis AP 601, APX 1038, APX 1040, and PY 10 adhesives. The adhesive may be applied utilizing an automated process as described above, or the adhesive 20 may be applied utilizing a manual process. For example, a manual process according to one aspect of the present invention includes combining 11.65 ounces of the APX 1039 adhesive with 3.3 ounces of water in a Wagner Flexio 570HVLP spray gun container. Chopped straw having a length of about 3 inches to about 7 inches is placed on a surface of about 20 inches by about 48 inches, and the adhesive 20 is sprayed at a distance of about 6 inches to about 12 inches onto the surface of the straw. The straw blanket is then forced air dried utilizing a fan, and cut into individual mats of about 20 inches by about 48 inches and stacked. The forced air drying process (manual and automated) preferably utilizes air that is at or below room temperature. Sheets of polymer film (not shown) may be positioned between the individual sheets of straw, and the straw blankets are preferably stacked in 15 sheets to form the equivalent of one bale that is equivalent to a 4'×25' commercial blanket. Alternatively, a 4'×25' blanket may be sprayed, forced air dried and rolled to form a single roll of material.

Referring again to the drawing, if the device 1 is utilized in connection with an ethylene vinyl adhesive, a fan unit 36 is positioned over the conveyor 8, or optionally over the second conveyor 32. The fan 36 blows air 38 onto the layer 12 of straw after spraying the ethylene vinyl acetate adhesive onto the straw utilizing applicator 18 of adhesive-applying device 16. The air 38 is preferably at room temperature or below room temperature. It will be understood that the device 16 and/or applicator 18 may include a suitable reservoir/pump unit 22 and conduit 24 as required for a particular adhesive composition. The straw may be formed into a roll 34 as discussed above. Alternatively, an elongated blade 40 may be utilized to cut the blanket 10 into individual pieces that may be stacked as described above.

In general, the blanket 30 has sufficient strength and flexibility to permit rolling of the blanket into a roll 34, and to permit subsequent handling and application of the blanket. Blanket 30 preferably has a strength of at least about 5.0 lbs. per linear foot of the material. Although the adhesive 20 preferably comprises an ethylene vinyl acetate adhesive, other adhesives may also be utilized according to the present invention.

The invention claimed is:

1. A method of making a netless mat for erosion control, the method comprising:
   providing plant material comprising stalks of plants;
   forming a layer of the plant material;
   applying an ethylene vinyl acetate adhesive to the layer of plant material;
   uniformly compressing the layer of plant material utilizing a pair of rollers;
   applying forced air onto the layer of plant material to cure the adhesive to thereby form a netless mat with sufficient strength for use to control erosion of soil.

2. The method of claim 1, including:
distributing the plant material on a conveyor.

3. The method of claim 2, including:
spraying adhesive on the plant material on the conveyor.

4. The method of claim 3, wherein:
the material is compressed after the adhesive is applied.

5. The method of claim 4, wherein:
the plant material is compressed before air is applied to cure the adhesive.

6. The method of claim 4, wherein:
the plant material is compressed after forced air is applied to cure the adhesive.

7. The method of claim 2, wherein:
the adhesive is sprayed on the plant material utilizing a spray head positioned above the plant material on the conveyor.

8. The method of claim 1, wherein:
the plant material comprises straw.

9. The method of claim 8, wherein:
the straw is initially in the form of bales; and including:
breaking up the bales into loose straw; and
distributing the straw on a moving conveyor using a tamber wheel.

10. The method of claim 1, wherein:
the forced air is at or below room temperature.

\* \* \* \* \*